Dec. 9, 1924.
J. W. McCLANAHAN
1,518,532
DEMOUNTABLE TIRE RIM
Filed Aug. 4, 1921
2 Sheets-Sheet 1
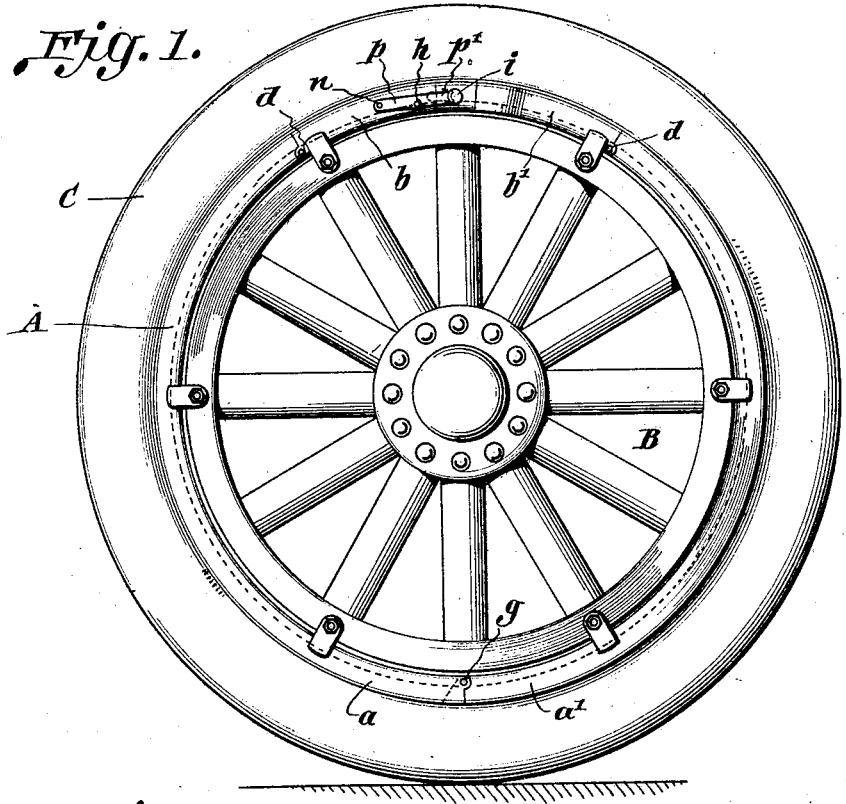
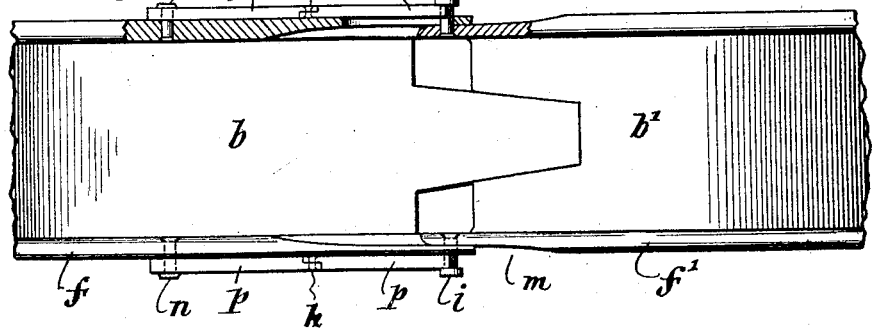
Inventor
J. W. McClanahan Dec. 9, 1924.                              1,518,532
J. W. McCLANAHAN
DEMOUNTABLE TIRE RIM
Filed Aug. 4, 1921          2 Sheets-Sheet 2
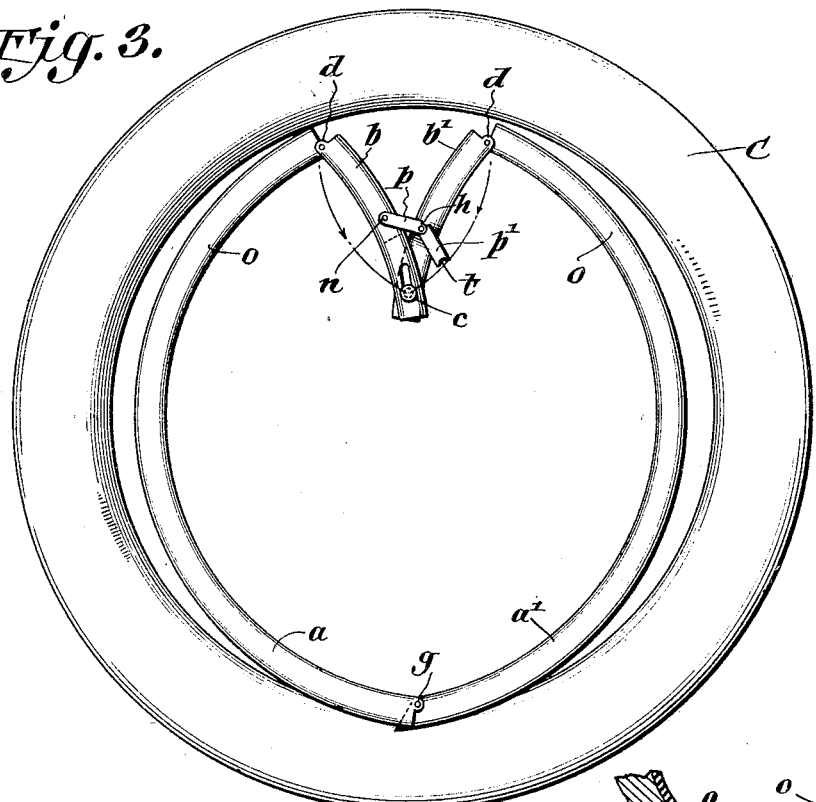
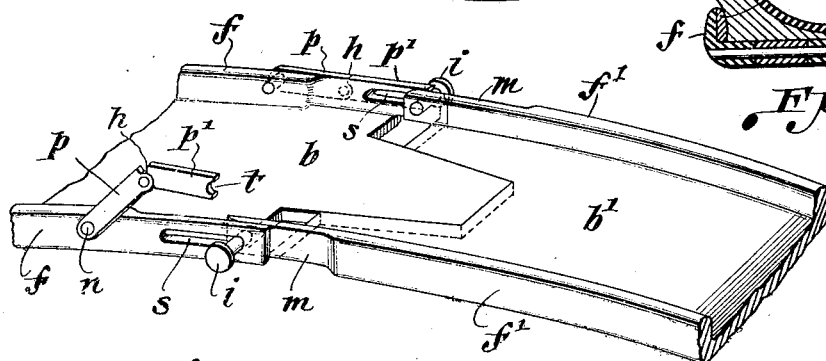
Inventor
J W McClanahan Patented Dec. 9, 1924.

1,518,532

UNITED STATES PATENT OFFICE.

JOSEPH W. McCLANAHAN, OF WASHINGTON, DISTRICT OF COLUMBIA.

DEMOUNTABLE TIRE RIM.

Application filed August 4, 1921. Serial No. 489,729.

*To all whom it may concern:*

Be it known that I, JOSEPH W. McCLANA-HAN, citizen of the United States, residing at Washington, in the District of Columbia, have invented a new and useful Demountable Tire Rim, of which the following is a specification.

My invention relates to improvements in demountable tire rims for automobiles and other vehicles, in which a collapsible rim is used for mounting a tire, and more especially of the deflatable type; and the objects of my improvement are, first, to provide a continuous rim on which the tire can be attached and replaced with ease and with greater rapidity than can be accomplished with rims of known construction; second, to provide a simple and economical structure of sufficient strength and rigidity to withstand the strains of travel.

I obtain these objects by the structure illustrated in the accompanying drawings, in which Fig. 1 is a side elevation of a wheel with my rim and a tire assembled thereon; Fig. 2 is a plan view, partly in section, showing the hinge connections between adjacent ends of two relatively short rim sections; Fig. 3 is a view similar to Fig. 1, showing the wheel removed, with toggle lock broken and rim collapsed; Fig. 4 is a detail in perspective, showing the central hinge and toggle lock; and Fig. 5 is a cross-section through one of the hinges connecting a section with the adjacent end of the main rim portion.

Similar letters refer to similar parts throughout the several views.

A tire C, is mounted on the rim A, which comprises the usual base or tread and upright flanged portions, and is detachably mounted on the wheel B. The rim is sectional, and so constructed that it is contractable and continuous throughout its circumference so that it can be broken down and contracted without separation or destroying its continuity.

The rim is composed of a main rim portion $a$, and a plurality, preferably two, of shorter sections $b$, $b'$, pivotally or flexibly connected together at adjacent ends $c$, and having their opposite ends flexibly connected or pivoted at $d$, to the respective ends of the main portion $a$. I prefer to construct the main rim portion in two sections $a$, $a'$, hinged or flexibly connected together at $g$, as shown in Fig. 1 and Fig. 3. It is obvious, however, that the hinge $g$, might be dispensed with and the main rim portion made in one piece.

In order to provide for the breaking of the section joints $c$, $d$, and to permit the central one $c$, to be readily forced inwardly or depressed toward the rim center as illustrated in Fig. 3, the latter joint has a slidable connection in the form of a pin and slot as shown in Fig. 4. The other two joints $d$, $d$, of the sections $b$, $b'$, are located in or adjacent the base or tread portion of the rim and may extend across the entire width thereof or each joint may comprise separate pivots, one at each side. The central joint $c$, at the contiguous ends of the sections $b$, $b'$, is formed in the flanges $f$, $f'$, and in the form illustrated comprises fixed pivot pins $i$, $i$, on the flanges $f'$, of section $b'$, slidably engaged with elongated slot $s$, formed in the flanges $f$, of sec. $b$.

To provide for the overlapping and telescopic action of the flanges $f$, $f'$, and at the same time retain them in line, the overlapping portions of adjacent flanges are cut away or recessed as shown at $m$, $m$, Fig. 2 and Fig. 4.

To strengthen and reinforce the joints $d$, $d$, the side flanges $f$, $f'$, of the sections $b$, $b'$, are made to overlap the flanges $o$, $o$, of the main rim portion $a$, as shown in cross-section, Fig. 5, the parts being recessed similarly to the recessed parts of the center joint shown in Fig. 2, and Fig. 4.

To positively secure the rim in its extended position I provide a toggle locking device shown in Fig. 3 and Fig. 4, as comprising two links $p$, $p'$, pivotally connected together at $h$, one of them $p$, being pivoted to flange $f$, at $n$, while the other $p'$, is provided with an end notch or recess $t$, adapted to engage the pivot pin $i$, of the central joint. Although one locking device would suffice I prefer to employ two, one in connection with each side flange, as shown in Fig. 4. It is evident that the link $p'$, instead of having an open ended notch in detachable engagement with the pivot pin $i$, might have a permanent connection by means of a closed slot engagement with the pin $i$.

In the extended position, with the tire assembled, the pivot points of the toggle being in line or on dead center, the latter will resist any force or pressure tending to break and depress the joint *c*, and to contract the rim.

In order to replace a tire, the latter, if of the inflating type, is deflated, then the toggle *p, p'*, is broken, being disengaged from the pivot pin *i*, as shown in Fig. 3 and Fig. 4; a kick is then given or a downward force or pressure is applied to the joint *c*, to cause it to assume the position shown in Fig. 3, when the tire can be readily detached and replaced by a new one.

I am aware that, prior to my invention, demountable rims have been made with means for contracting and expanding the same.

What I claim is:

1. In a demountable tire rim, the combination of a plurality of pivotally connected rim sections, one of said connections having a sliding movement, with a toggle lock comprising a pair of links, one of said links pivotally connected with one rim section and the other detachably engaged with the pivot of the adjacent section, to be disengaged therefrom when unlocked, whereby the rim can be collapsed inwardly without separation and the rim locked in the expanded position.

2. In a demountable tire rim, the combination of a plurality of pivotally connected sections, one of said connections comprising a pin and slot engagement with a toggle lock, one end of the toggle pivoted to one section and the other provided with a notch to be detachably engaged with the pivot pin to lock the rim in the expanded position whereby the toggle can be broken and disengaged and the connection collapsed inwardly without separation of the sections.

J. W. McCLANAHAN.